United States Patent [19]

Buschbom et al.

[11] 4,170,385

[45] Oct. 9, 1979

[54] SILO UNLOADER WITH LEVELING AND DRIVE STRUCTURE

[75] Inventors: Floyd E. Buschbom, Long Lake; Glen D. Hansen, Maple Plain; Jerome T. Paulson, Long Lake, all of Minn.

[73] Assignee: Veda, Inc., Long Lake, Minn.

[21] Appl. No.: 759,417

[22] Filed: Jan. 14, 1977

[51] Int. Cl.² .................................. B65G 65/38
[52] U.S. Cl. ........................... 406/59; 414/316; 414/322; 406/114
[58] Field of Search ............... 214/17 DB; 302/56; 222/405

[56] References Cited

U.S. PATENT DOCUMENTS

| | | | |
|---|---|---|---|
| 2,651,438 | 9/1953 | Peterson | 214/17 DB X |
| 2,671,696 | 3/1954 | McLean | 302/56 |
| 2,801,885 | 8/1957 | Harris | 302/56 |
| 3,017,043 | 1/1962 | Buschbom | 214/17 DB |
| 3,017,044 | 1/1962 | Englemann | 214/17 DB |
| 3,090,506 | 5/1963 | Buschbom | 214/17 DB |
| 3,338,636 | 8/1967 | Chapman et al. | 302/56 |
| 3,462,199 | 8/1969 | Harris et al. | 214/17 DB X |
| 3,670,907 | 6/1972 | Downing | 214/17 DB |
| 3,896,942 | 7/1975 | Couture et al. | 214/17 DB |

*Primary Examiner*—Robert G. Sheridan
*Attorney, Agent, or Firm*—Burd, Braddock & Bartz

[57] ABSTRACT

A top unloading silo unloader pendantly supported in a tower silo. The unloader has a material collector moved around the silo with an automatic leveling and drive structure. An impeller receives material from the collector and throws the material into an out chute which directs the material to a doorway leading to an upright passageway. The leveling and drive structure mounted on the outer end of the collector has leading and trailing drive wheels connected with adjustable mounts to a leveling apparatus. Power is applied to both wheels by separate drive shafts connected to the power transmission for the augers of the collector. The leveling apparatus has a base secured to the collector. Supports pivotally mounted on opposite ends of the base are attached to the mounts for the wheels. A linear actuator connected to the supports operates to concurrently pivot the supports in opposite directions so that the outer end of the collector can be raised or lowered and held in a selected position. Linear actuator has a reversible electric motor coupled to a motor controller. A generally horizontal reference arm attached to a non-pivoting part of the unloader is linked to the controller so that movement of collector up or down actuates the controller whereby the motor operates the linear actuator to increase its overall length to raise the outer end of the collector or to decrease its overall length to lower the outer end of the collector thereby maintaining the outer end of the collector at a selected position.

60 Claims, 10 Drawing Figures

FIG. 1

SILO UNLOADER WITH LEVELING AND DRIVE STRUCTURE

BACKGROUND OF THE INVENTION

Top unloading silo unloaders are used to remove all forms of feed materials from tower silos. These materials include silage and haylage ranging from hard binding material, padded and interlocked fibrous material, to loose light and soft material. During the cold season in northern geographic areas, the material adjacent the silo wall becomes a hard frozen mass. This hard frozen material is cut up and chipped from the silo wall with power-driven wall cleaners located on the wall end of the unloader. Different types and densities of material stored in tower silos make it difficult to efficiently remove the material from the silos.

Top unloading silo unloaders have the greatest material removing efficiency when they are generally horizontally level or a small upwardly directed cone and move around the silo wall at a constant or even speed. Under these operating conditions, the gathering and the flow of material through the unloader is uniform and at maximum capacity. Uneven material flow and large bunches of material reduce capacity of the unloader and can plug the unloader.

Large diameter tower silos, 20 to 30 feet, require large silo unloaders with long collectors. These collectors handle a large volume of material which must be evenly fed into the impeller. Maintaining the collector in a selected operating position, as a horizontally level position or at a slight angle and driving the collector around the silo wall at an even speed is desirable to insure even feeding of the material so that a high volume of material can be efficiently handled by the unloader.

Prior top unloading silo unloaders have the outer ends of the collectors in engagement with the top of the material when the unloader is not operating. These unloaders have high starting torque because they are started under partial load. In very cold conditions, top unloaders can freeze up if they are not cleared of material.

PRIOR ART

The following U.S. patents show top unloading silo unloaders equipped with leveling and drive wheels. U.S. Pat. Nos. 2,671,696 McLean, 2,801,885 Harris, 3,017,043 Buschbom, 3,017,044 Englemann, 3,090,506 Buschbom, 3,338,636 Chapman et al, 3,462,199 Harris et al, 3,670,907 Downing, 3,896,942 Couture et al,

SUMMARY OF THE INVENTION

The invention relates to a material handling machine operable to gather material stored in a first location and move the gathered material to a second location. More particularly, the invention is directed to a top unloading silo unloader having a material collector equipped with an automatic leveling apparatus having driving wheel means to move the collector around the silo. The material gathered by the collector is delivered to an impeller which throws the material into an out chute which directs the material to an open doorway in the silo wall. The impeller is pivotally connected to a slip-ring assembly in a manner which allows the collector to move up and down relative to a reference position. A cable pendantly connected to the slip-ring assembly supports the inner portion of the unloader from a structure, as a tripod, mounted on top of the silo wall. The leveling apparatus is rendered operable or non-operable by a control unit to maintain the outer end of the collector in a selected operating position. The control unit is connected to a fixed reference means which actuates the control unit in response to up and down movements of the outer end of the collector. Specifically, the leveling apparatus secured to the outer end of the collector has a first pivoted support connected to a first mount. A first wheel attached to the first mount is located adjacent the leading side of the collector. A second wheel attached to the second mount is located adjacent the trailing side of the collector. Each support has an upwardly directed arm connected to an extendible and contractable means, as a linear actuator or hydraulic piston and cylinder assembly. The linear actuator has a reversible motor and movable members connected to the arms. The control unit mounted on the collector operates to keep the motor in its inoperative condition and control the operation of motor to change the length of the actuator. When the length of the actuator is increased, the outer end of the collector is raised. When the length of the actuator is shortened, the outer end of the collector is lowered. The reference means includes a reference arm mounted on the rotatable part of the slip-ring assembly. The reference arm is held in a constant reference location as it moves in a circular path along with the collector. A link connects the reference arm to the control unit whereby up and down movement of the outer end of the collector relative to the reference arm operates the control unit to provide power to the reversible motor. When there is no up and down movement of the outer end of the collector relative to the reference arm, the control unit remains in its off condition. The control unit automatically functions to maintain the motor in its inoperative condition or to control the operation of the motor in either a forward or reverse direction as the collector moves around the silo wall.

An object of the invention is to provide an apparatus for automatically maintaining a top unloading silo unloader in a selected operating position as the collector moves around the silo wall. Another object of the invention is to provide a drive and leveling structure on the outer end of a collector of a top unloading silo unloader that is operable to maintain the wall cleaners of the unloader parallel with the inside wall of the silo. A further object of the invention is to provide drive wheel means for a top unloading silo unloader that adds weight to the outboard end of the unloader to stabilize the unloader in all conditions, including hard frozen material. Yet another object of the invention is to provide a leveling and drive structure for a top unloading silo unloader that automatically changes the weight applied to the outer end of the unloader to maintain the unloader in a selected operating position. Another object of the invention is to provide a power operated leveling means for a collector of a top unloading silo unloader that is sensitive and operable to relatively small up and down movements of the collector to maintain the collector in a selected operating position. A further object of the invention is to provide a drive and leveling structure for a top unloading silo unloader that maintains the unloader in a selected operating position during the opening of a tower silo and during continued use of the unloader in the silo. Yet another object of the invention is to provide drive structure for drive wheels cooperating with leveling structure for a top unloading silo unloader that is independent and isolated from the drive wheels and does not impart a twisting force to the collector. These and other objects and advantages of the silo unloader and leveling and drive therefor of the invention are set forth in the following detailed description and drawings of one form of the silo unloader and leveling and drive apparatus therefor.

Figure 1:
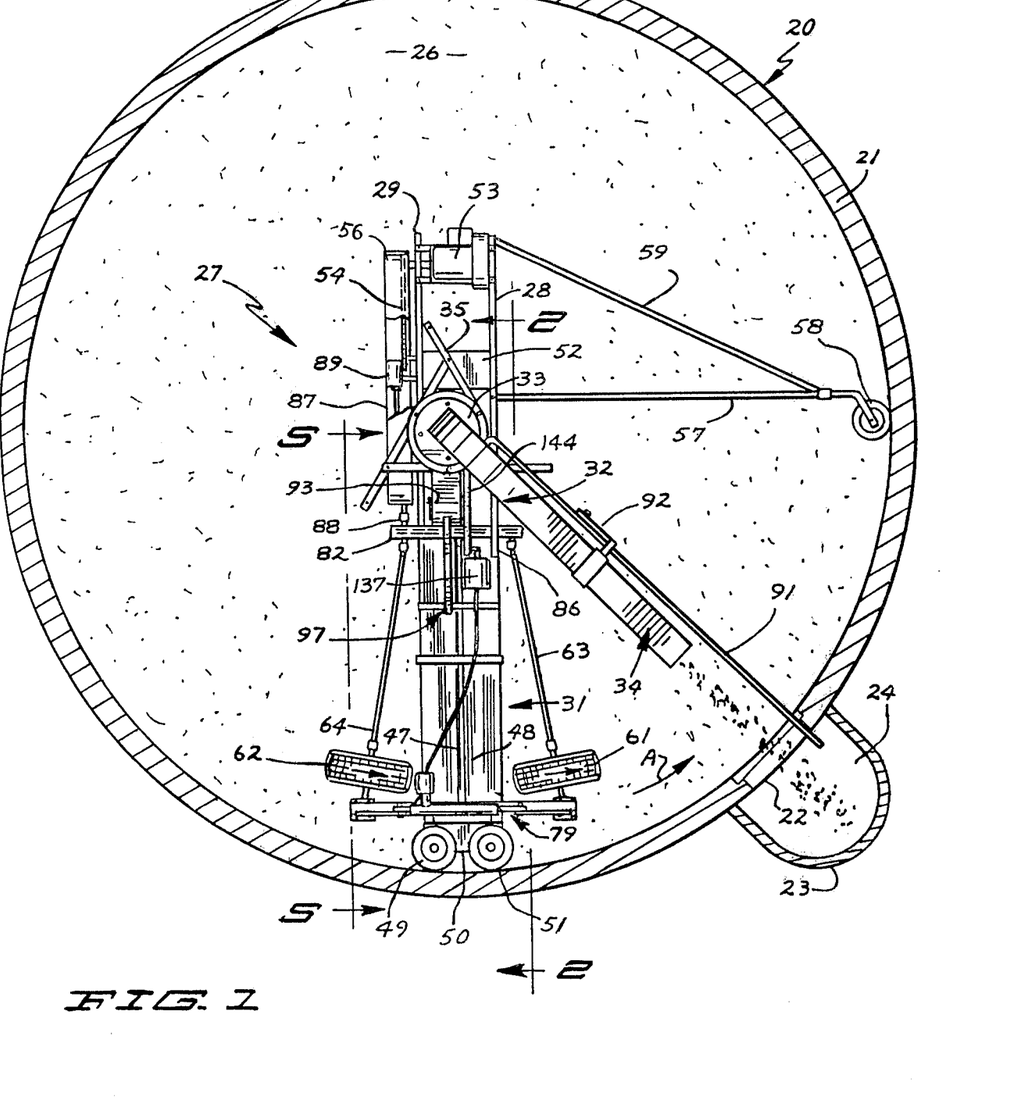
FIG. 1 is a top plan view of the top unloading silo unloaded of the invention located in a tower silo.

DESCRIPTION OF PREFERRED EMBODIMENT:

Referring to FIG. 1, there is shown a cross sectional view of a tower silo indicated generally at 20 having an upright cylindrical wall 21. Wall 21 extends around a cylindrical chamber or material storage area for storing bulk feed materials 26, as silage, haylage, grains, and the like. Other types of particulate materials can be stored in silo 20. Wall 21 has a plurality of vertical aligned openings or doorways 22 providing access between the interior of silo 20 and a chute 23. Chute 23 is an upright generally U-shaped wall located around an upright passage 24 in communication with doorways 22 so that material moved through an open doorway 22 will fall to the base of silo 20. Conveyor structures can be used to move the material from the base of the silo to bunk feeders or vehicles for moving the material to feeding locations.

A top layer of feed material 26 is mechanically removed from the silo by a machine known as a top unloading silo unloader indicated generally at 27. Unloader 27 operates to continuously pick up or gather a top layer of feed material and move the material through one of the open doorways 22 into passage 24.

Figure 2:
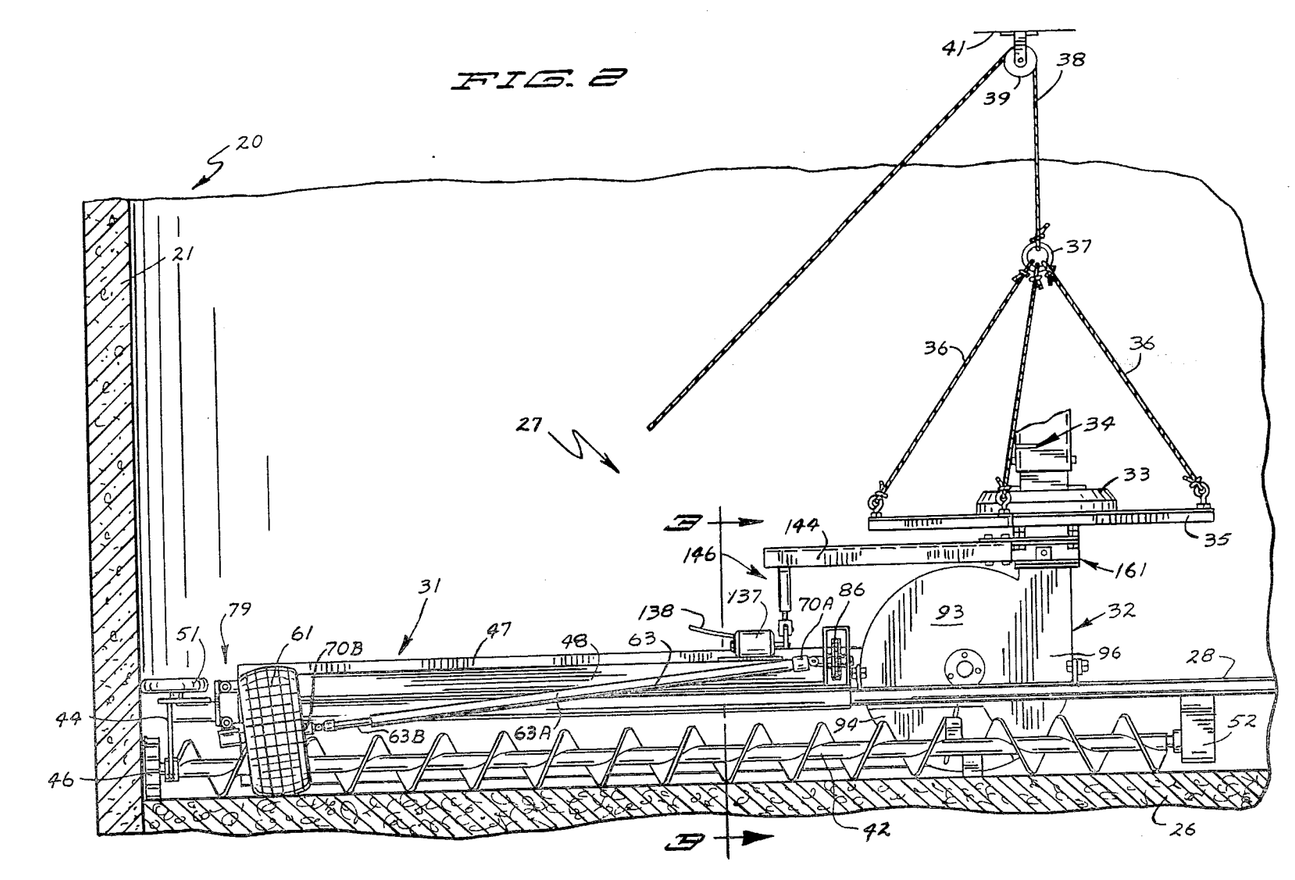
FIG. 2 is an enlarged sectional view taken along line 2—2 of FIG. 1.
Figure 3:
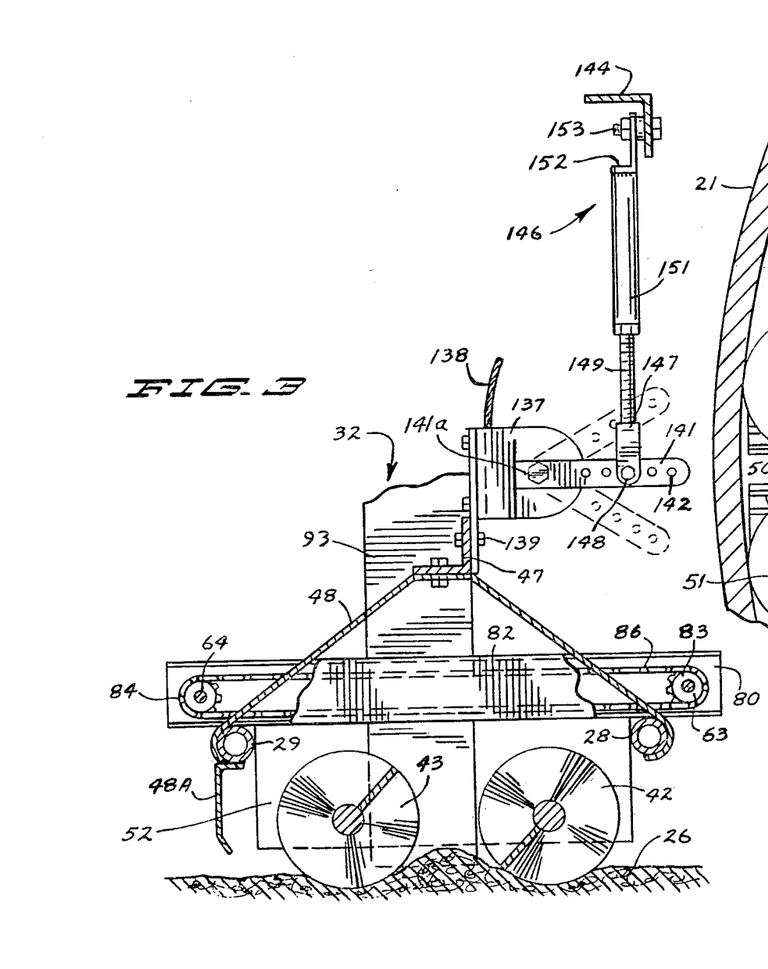
FIG. 3 is an enlarged sectional view taken along the line 3—3 of FIG. 2.

Referring to FIGS. 2 and 3, silo unloader 27 has a pair of longitudinal frame members 28 and 29 shown as tubular beams. Frame members 28 and 29 can be channel-shaped beams. Frame members 28 and 29 extend outwardly parallel to each other toward wall 21 and form part of a material collector indicated generally at 31.

Collector 31 circumferentially moves on the surface of the material 26 around the silo in a circular path in the direction of arrow A and operates to gather a top layer of material and move the material to an impeller indicated generally at 32. Impeller 32 picks up the material and throws the material through an out or discharge chute 34. An example of the details of impeller 32 is disclosed by Hansen in U.S. Pat. No. 3,589,500. Chute 34 has an outer end inwardly spaced from and facing a doorway 22 so that the material moving through the chute 34 is directed through the doorway 22 into passage 24. The inlet end of chute 34 is pivotally mounted on a slip-ring assembly 33. Slip-ring assembly 33 has a non-rotatable part carrying a rotatable member. The non-rotatable part and rotatable member each have a central passageway or hole allowing the material to move from the impeller into the out chute 34. Examples of slip-ring assemblies are shown in U.S. Pat. Nos. 3,517,369, and 3,594,680.

A triangular frame assembly indicated at 35 is attached to the lower side of the non-rotatable member of the slip-ring assembly 33. Frame assembly 35 comprises three angle members positioned about slip-ring assembly 33. Each angle member has an outer end attached to a cable 36. The three cables 36, as shown in FIG. 2, extend upwardly and are attached to a centering ring or connector 37. A single cable 38 secured to ring 37 pendantly supports silo unloader 27 from a support 41. A pulley 39 secured to support 31 carries cable 38. Cable 38 extends from pulley 39 to a winch (not shown) secured to the outside of the base of the silo. The winch is operable to raise the inner end of the silo unloader above the surface of the material whereby the silo unloader can be stored in a raised position. An example of the winch is shown in U.S. Pat. No. 3,235,229. Support 41 can be the frame structure of the roof of the silo or a tripod mounted on the top of silo wall 21. Examples of tripod structures are shown in U.S. Pat. Nos. 3,128,081 and 3,211,407.

As shown in FIGS. 2, 3, 4, and 5, collector 31 has a horizontal leading auger 42 and a horizontal trailing auger 43 located between frame members 28 and 29. The outer ends of augers 42 and 43 are rotatably mounted on a downwardly directed bracket 44 secured to the outer ends of frame members 28 and 29. Augers 42 and 43 can be of different diameters and rotate at different speeds. An example of a differential speed auger arrangement is shown in U.S. Pat. No. 3,822,796.

Wall cleaners 46 are secured to the outer ends of auger 42 and 43. Wall cleaners 46 have a plurality of outward radially directed cutting members or detachable knives operable to cut and remove hard frozen material from the inside of wall 21. Wall cleaners 46 can be the wall cleaners disclosed in U.S. Pat. No. 3,651,960. Other types of wall cleaners can be attached to and rotate with the ends of augers 42 and 43.

A longitudinal center top beam 47 located over augers 42 and 43 is connected to frame members 28 and 29. A cover 48 is secured to beam 47. Cover 48 has downwardly directed side flanges that extend a short distance over the outsides of frame members 28 and 29. A downwardly directed rear shield 48A is secured to frame member 29. Shield 48A is located rearwardly of the trailing auger 43 and extends the length of collector 31.

Figure 4:
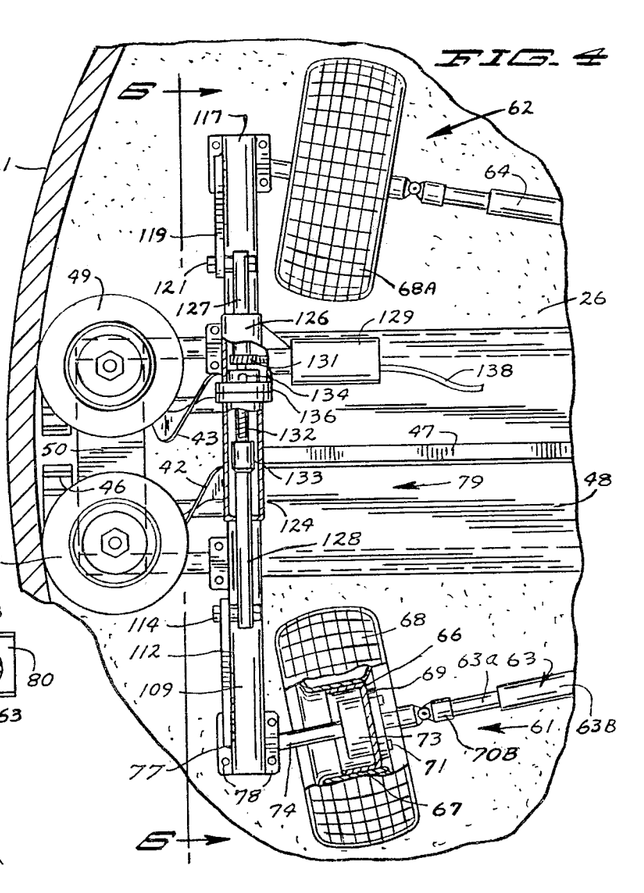
FIG. 4 is a plan view, partly sectioned, of the outer end of the collector of the silo unloader of FIG. 1.
Figure 5:
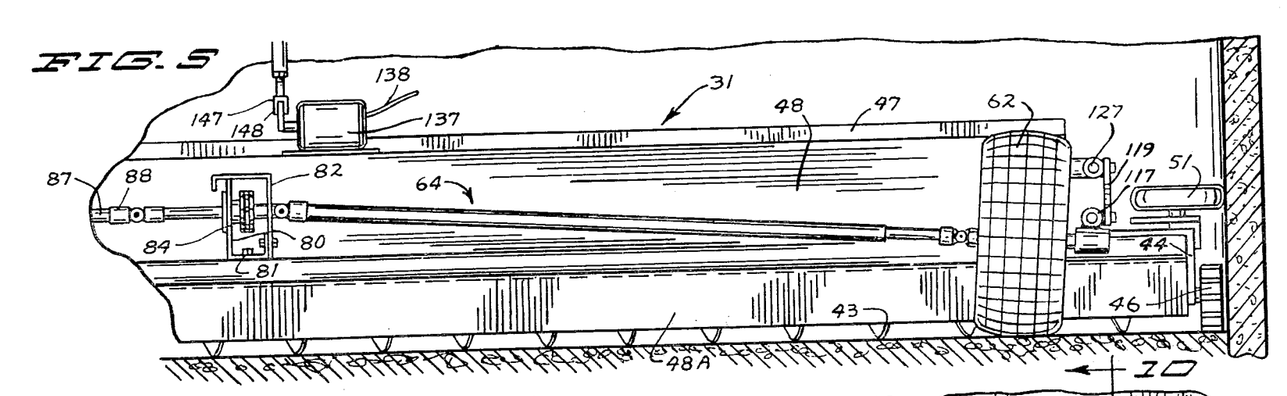
FIG. 5 is an enlarged sectional view taken along the line 5—5 of FIG. 1.

A pair of wall engaging horizontal wheels 49 and 51 are rotatably mounted about separate upright axles attached to a horizontal plate 50. Plate 50 is secured to the outer ends of frame members 28 and 29. Wheels 49 and 51 are located in a generally horizontal plane and ride on the inside surface of wall 21. As shown in FIGS. 4 and 5, wheels 49 and 51 space wall cleaners 46 a short distance from the inside surface of wall 21. When wheels 49 and 51 are in engagement with the inside surface of wall 21, collector 31 is in a position to gather material. Wall cleaners 46 are parallel to the upright wall 21 of the silo when collector 31 is in a level or horizontal position.

Augers 42 and 43 are rotated in opposite directions by a gear box 52 mounted on frame members 28 and 29. An electric motor 53 drives gear box 52 and the rotor of impeller 32 through a power transmission 54, as a belt and pulley drive. An elongated shield 56 covers power transmission 54.

Returning to FIG. 1, an outwardly directed arm 57 is secured to the inner end of frame member 28. A forward guide wheel 58 is rotatably mounted on the outer end of arm 57 and engages the inside surface of wall 21. A brace 59 secured to frame member 28 and the outer end of arm 57 stabilizes the arm 57 and locates the arm 57 approximately 90° in front of the collector 31.

Figures 6, 7, 8:
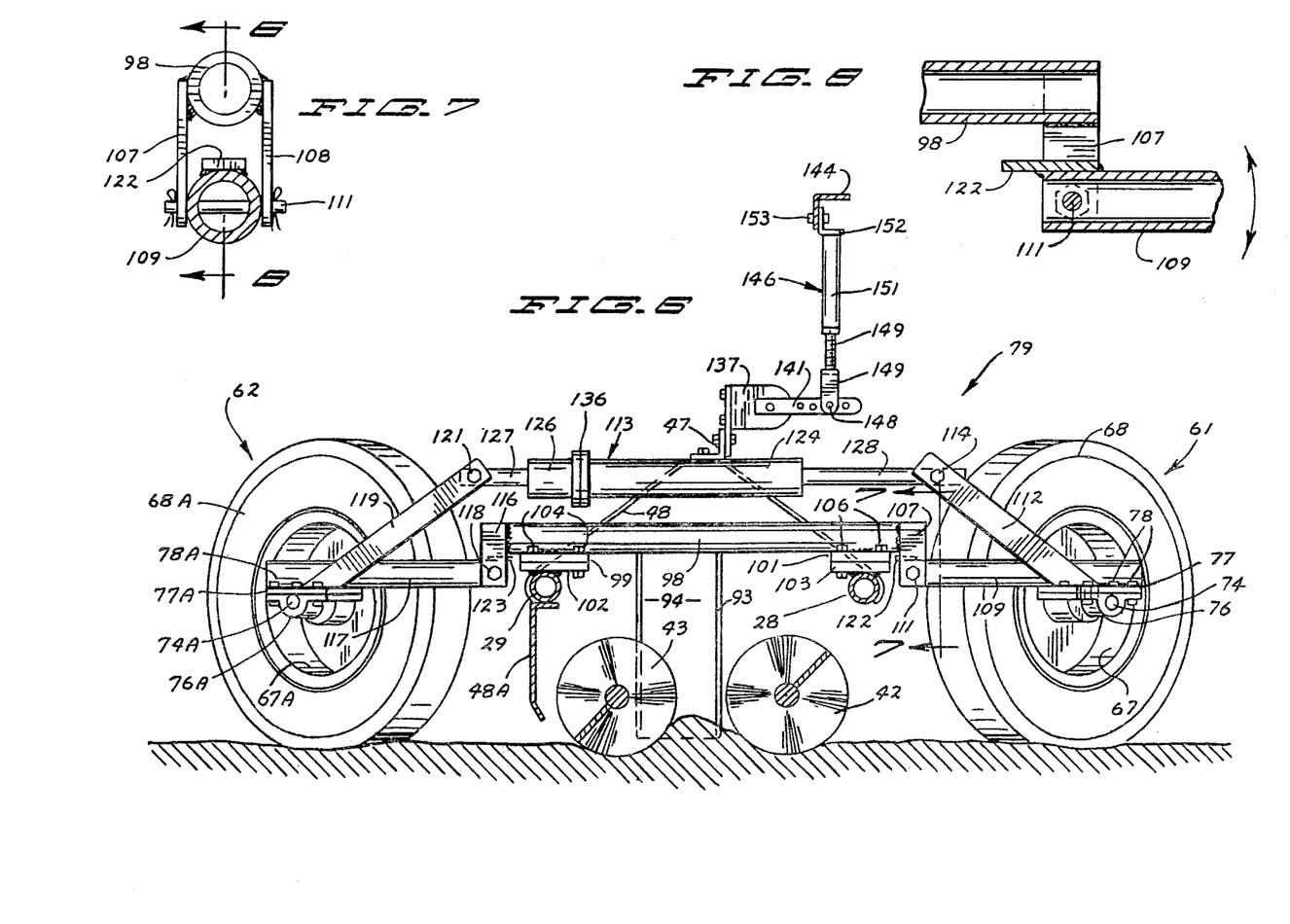
FIG. 6 is an enlarged sectional view taken along the line 6—6 of FIG. 4.
FIG. 7 is an enlarged sectional view taken along the line 7—7 of FIG. 6.
FIG. 8 is a sectional view taken along the line 8—8 of FIG. 7.

Collector 31 is driven around the silo wall 21 in the direction of the arrow A with a pair of drive wheels 61 and 62. Wheels 61 and 62 are located adjacent opposite sides of the outer end of collector 31 and engage the top surface of material 26. A first drive shaft 63 is connected to wheel 61. In a similar manner, a second drive shaft 64 is connected to wheel 62. Each drive shaft 63 and 64 is secured to a pair of universal joints 70A and 70B allowing the turning radius of wheels 61 and 62 to be angularly adjusted. Each shaft, 63 and 64, has a first elongated tubular member 63B, 64B, telescoped on a second member 63A, 64A. A first universal joint 70A is secured to tubular member 63B and a second universal joint is secured to member 63A. Referring to FIG. 4, wheel 61 has a hub 66 carrying a rim 67. A pneumatic tire 68 is mounted on rim 67. Disc or flange 69 is secured to universal joint 70B on the outer end of shaft 63. A plurality of bolts 71 secure the disc 69 to the hub 66 and a bearing unit 73. The bearing unit 73 is mounted on an axle 74. As shown in FIG. 6, axle 74 extends outwardly from wheel 61 and is mounted in a sleeve 76. Sleeve 76 is secured to a plate 77 with a plurality of fasteners 78. Sleeve 76 has a plurality of holes for accommodating the fasteners 78. The holes permit the sleeve to be located in a plurality of positions on plate 77 whereby the turning radius of the wheels 61 and 62 can be adjusted. When the turning radius of the wheels 61 and 62 is greater than the radius of curvature of the silo wall 21, drive wheels 61 and 62 urge collector 31 toward wall 21 and maintain the wheels 49 and 51 in engagement with the inside surface of the wall 21. Plate 77 is connected to the forward end of a leveling linkage indicated generally at 79. Wheel 62 is connected to drive shaft 64 and the opposite end of leveling linkage 79 in a similar manner. The parts of wheel 62 that correspond to parts of wheel 61 have the same numbers with the reference suffix A.

As shown in FIGS. 3 and 5, a cross member 80 extends across the midsection of frame members 28 and 29 and is secured thereto by bolts 81. A generally L-shaped cover member 82 is located over cross member 80 and forms therewith a transverse passage for accommodating the drive structure connecting drive shafts 63 and 64. The drive structure includes a sprocket 83 mounted on shaft 63 and a sprocket 84 mounted on shaft 64. An endless roller link chain 86 connects sprockets 83 and 84 so that when power is applied to shaft 64 wheels 61 and 62 are simultaneously rotated to move collector 31 around silo wall 21. As shown in FIGS. 1 and 5, drive shaft 64 is connected to a power shaft 87 with a suitable universal joint 88. Power shaft 87 is connected to an output drive shaft of gear box 89. The input drive of gear box 89 is connected to an output shaft of auger gear box 52. Upon operation of motor 53, power transmission 54 drives gear box 52. Gear box 52 rotates the augers 42 and 43 and applies power to gear box 89. The endless chain 86 transmits the power from shaft 64 to shaft 63 so that wheels 61 and 62 are driven in a clockwise direction as viewed in FIG. 6 at substantially the same rate of speed. Wheels 61 and 62 move collector 31 around the silo wall 21 in the direction of the arrow A, shown in FIG. 1. This drive structure for wheels 61 and 62 is independent and isolated from the mounting structure for the wheels so that rotational torque applied to the wheels is independent of the leveling structure mounted on the outer end of collector 31. Also, the drive structure insures uniform weight and torque distribution on the outer end of collector 31.

Out chute 34 is maintained in radial alignment with doorway 22 by a torque arm 91. The inner end of torque arm 91 is pivotally connected to slip-ring assembly 33. The outer end of torque arm 91 extends through doorway 22 and engages a portion of silo wall 21. An upright support member 92 secured to a midportion of torque arm 91 is pivotally connected to the top of out chute 34. Support member 92 maintains the out chute 34 in general vertical alignment with torque arm 91 and in general radial alignment with passageway 22.

Figures 9, 10:
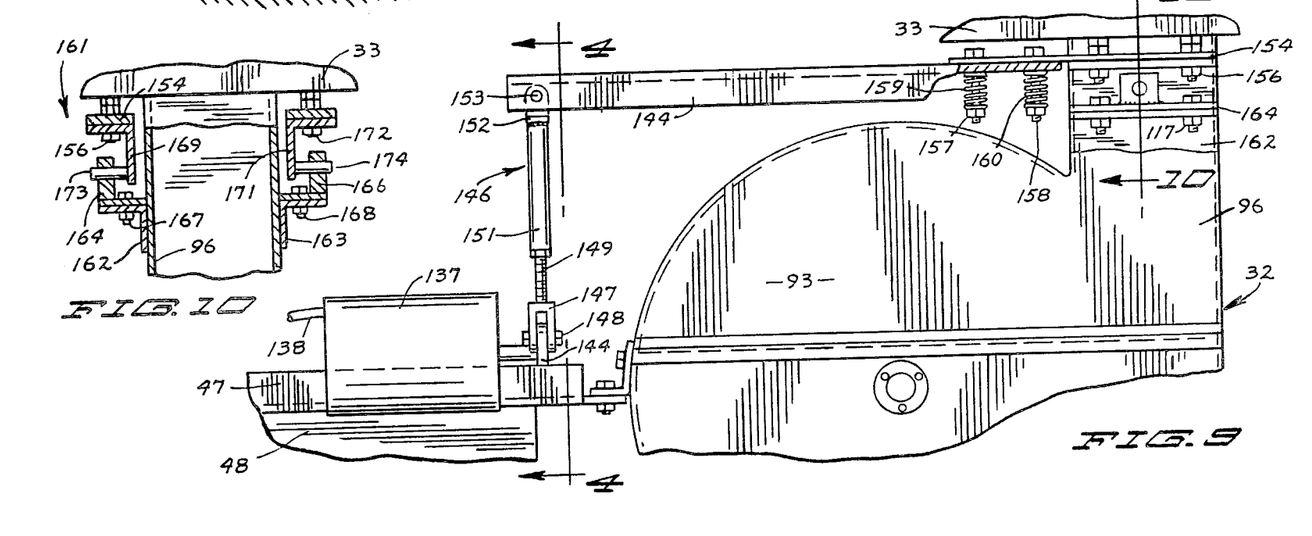
FIG. 9 is a side elevational view of the impeller part of the silo unloader.
FIG. 10 is an enlarged sectional view taken along the line 10—10 of FIG. 9.

Referring to FIG. 2, impeller 32 has a housing 93 having a lower inlet or entrance opening 94 for receiving the material from augers 42 and 43. As shown in FIG. 9, housing 93 has an upwardly directed tangential outlet neck 96 attached to the lower side of the slip-ring assembly 33. Neck 96 has a generally square opening which forms a passage for directing the material through slip-ring assembly 33 and out chute 34.

Referring to FIG. 1, a holder indicated generally at 97 is secured to housing 93 and frame member 28 and 29. Holder 97 is used with a lifting cable to elevate the entire unloader in silo 20. The details of holder 97 are disclosed in U.S. Pat. No. 4,132,450.

Referring to FIGS. 6-8, leveling linkage 79 has a transverse base 98 extended across the outer ends of frame members 28 and 29. Plates 99 and 101 are secured to the lower portions of opposite ends of base 98 and rest on pads 102 and 103 secured to the frame member 28 and 29 respectively. Plates 99 and 101 and pads 102 and 103 have aligned holes for accommodating fasteners 104 and 106, as nut and bolt assemblies, securing the plates to the pads.

A pair of downwardly directed flat ears 107 and 108 are secured to the right end of base 98 as viewed in FIG. 6. A first horizontal support 109 is pivotally connected to the ears 107 and 108 with a transverse pivot pin 111. Mount or plate 77 is secured to the lower outer end of support 109 and thereby supports wheel 61 on the end of support 109. An upwardly and inwardly directed arm 112 is secured by welds or the like to the outer section of support 109. The upper inner end of arm 112 is pivotally connected to a linear actuator indicated generally at 113 with a transverse pivot pin 114. The opposite end of base 98 has downwardly directed ears 116 accommodating a second outwardly extending horizontal support 117. A transverse pivot pin 118 pivotally connects support 117 to ears 116. The outer end of support 117 is secured to mount or plate 77A which in turn carries sleeve 76A for the axle 74A of wheel 62. An upwardly and inwardly directed or inclined arm 119 is connected to linear actuator 113 with a transverse pivot pin 121. A short stop plate 122 is secured to the top of the inner portion of support 109. Stop plate 122 is located between the ears 106 and 107 and is adapted to engage the lower side of base 98 to determine the maximum elevated or raised position of collector 31. Support 117 has a similar stop plate 123 located between ears 116 and engageable with the other end of base 98. Stop plates 122 and 123 prevent wheels 61 and 62 from hitting augers 42 and 43 when collector 31 is raised from the top of the material in the silo.

Linear actuator 113, shown in FIGS. 4 and 6, is an electrical-mechanical apparatus that selectively extends and contracts in a linear direction. Actuator 113 has a cylindrical casing 124 connected to a body 126 and is pivotally connected to arm 119 with pivot pin 121. A rod-like actuator 128 extends linearly from body 124. The outer end of actuator 113 is connected with pivot pin 114 to arm 112. The reversible electric motor 129 is mounted on body 126. Motor 129 can be a reversible hydraulic motor.

Referring to FIG. 4, linear actuator 113 has a worm gear drive 131 connected to the output drive shaft of a reversible electric motor 129. Worm gear drive 131 is secured to a longitudinal screw 132 located in longitudinal alignment with actuator 128. A collar 133 having a plurality of helical grooves and carrying ball bearings operatively join screw 132 to the actuator 128. Upon rotation of screw 132 by operation of worm gear drive 131, the ball bearings move in an endless helical path and convert rotary motion of screw 132 to a linear motion of actuator 128. The drive train from worm gear drive 131 is through a clutch 134. The clutch 134 is an overload clutch which allows motor 129 to operate at the end of the stroke or when a preset load limit is encountered. The clutch can be a ball detent-type clutch. The worm gear drive 131 prevents extension and contraction of the actuator when motor 129 is not operated. In other words, worm gear drive 131 holds the actuator in a fixed adjusted position when the power is removed, i.e., when motor 129 is deenergized. The entire linear actuator 113 is a rigid link thereby holding collector 31 in an adjusted selected operating position.

Motor 129 is a reversible electric motor controlled by a motor control unit or controller 137. An electric cable or line 138 connects controller 137 with motor 129. As shown in FIG. 3, bolts 139 secure controller 137 to the center top beam 47 of collector 31. Controller 137 has a movable actuator arm 141 having a plurality of holes 142. Controller 137 is a reversing switch controlled by the position of arm 141. The switch is a two on position switch with a dead center or positive center off position between the two on positions. Arm 141 is normally located in the center off position and can only be moved to one on position at a time. In other words, the two on positions of the switch can not be attained at the same time. When arm 141 is in the horizontal position as shown in full lines in FIG. 3, controller 137 is in the center off or neutral position. Arm 141 is moved to the up first on position when collector 31 falls below its selected operating position. When arm 141 moves to its down second on position, collector 31 has raised or moved to an up position above its selected operating position. Controller 137 functions to control the reversible electric motor 129 to automatically actuate linear actuator 113 whereby collector 32 is returned to its selected operating position. Controller 137 can also be a hydraulic valving structure operable to control a reversible hydraulic motor used to drive linear actuator 113. A hydraulic or pneumatic piston and cylinder assembly can be used in lieu of linear actuator 113. A reversing valve can be used to selectively extend or contract the piston and cylinder assembly.

Arm 141 secured to controller shaft 141A is connected with a horizontally fixed reference arm 144 with an adjustable length link 146. Link 146 has a bottom clevis 147 connected with a pin 148 to arm 141. Pin 148 can be selectively positioned in any one of holes 142 controlling the amount of angular up-and-down movement of arm 141. This controls the sensitivity of the switch; the smaller the angular movement of arm 141, the more sensitive the switch. Link 146 has a threaded rod 149 threaded into an upright sleeve 151. The rotation of rod 149 adjusts length of link 146. An angle member 152 is secured to the upper end of sleeve 151. A pivot bolt 153 connects angle member 152 to the outer end of arm 144. The length of link 146 can be adjusted to change the selected operating position of collector 32. Collector 31 can be located in its normal or selected operating position at an angle leading toward or leading away from silo wall 21. The selected position can be in a horizontal level plane.

Referring to FIGS. 9 and 10, arm 144 is connected to the rotatable member of slip-ring assembly 33 with a short plate 154. Bolts 156 secure plate 154 to the bottom side of slip-ring assembly 33. A pair of nut-and-bolt assemblies 157 and 158 having coil springs 159 and 160 yieldably hold arm 144 in flat engagement with the bottom of plate 154. Springs 159 and 160 bias arm 144 in an upward direction and allow arm 144 to be moved away from plate 154. Arm 144 can be moved downwardly and upwardly against biasing force of springs 159 and 160.

A hinge assembly indicated generally at 161 pivotally connects impeller 32 to the rotatable member of slip-ring assembly 33. Hinge assembly 161 is mounted on a pair of angle supports 162 and 163 secured to opposite sides of neck 96. Hinge assembly 161 has a first pair of members 164 and 166 attached to supports 162 and 163 with nut-and-bolt assemblies 167 and 168. A second pair of members 169 and 171 are attached to slip-ring assembly 33 with nut-and-bolt assemblies 172 and 156. Pivot pins 173 and 174 pivotally connect members 164, 166 with member 169, 171 whereby collector 31 angularly moves or pivots about the horizontal axis of pins 173 and 174. Arm 144 provides a constant reference structure for collector 31. Up and down movement of collector 31 results in actuation of motor controller 137. Controller 137 regulates the electric power supplied to motor 129.

In use, the winch assembly is used to lower the unloader 27 into engagement with the top surface of material 26 stored in the silo. The augers 42 and 43 are in surface engagement with the material 26. Drive wheels 61 and 62 are in driving engagement with the material adjacent to wall 21. Wall engaging wheels 49 and 51 are located in engagment with the inside surface of wall 21.

Motor control unit 137 will operate the electric motor 129 of linear actuator 113 if the outer end of collector 31 is not in its selected operating position. Linear actuator 113 will either expand or contract to relocate the outer end of collector 31 to its selected operating position.

Motor 53 for the unloader operates to drive the rotor of impeller 32 and gear box 52. This rotates the augers 42 and 43 and applies the driving power to wheels 61 and 62. Wheels 61 and 62 move the collector 31 in a circular path as indicated by arrow A in FIG. 1 around the inside of silo wall 21. Drive wheels 61 and 62 are angularly positioned or have a turning radius such that the collector 31 is urged in an outward direction whereby wheels 49 and 51 are in firm engagement with the inside surface of wall 21. The wall cleaners 46 are located in a vertical position in close proximity to the inside of wall 21. The wall cleaners 46 rotate to chip the material from wall 21 and move the material to the inlet portions of augers 42 and 43.

The inner end of the unloader 27 is pendantly supported by the cable 38 from the top support, as a tripod, mounted on the top of silo wall 21. The slip ring assembly 33 held by the cable 38 in a reference position also holds the reference arm 144 in a reference position. The reference arm 144 is connected to the rotatable portion of slip-ring assembly 33 so that it moves around the silo along with collector 31.

When a collector 31 engages a hard area of the material 26 or an elevated portion of the material 26, wheels 61 and 62 riding on the hard material will move collector 31 to an up or raised position. Arm 141 of motor control unit 137 moves from the center off position to the down on position, as shown by broken lines in FIG. 3. Control unit 137 supplies electric power to the electric motor 129 to drive the motor in a first direction, thereby contracting the linear actuator 113. This causes the outer end of collector 31 to move down to its selected operating position. When collector 31 returns to its selected operating position, arm 141 returns to its center off or neutral position as shown in full lines in FIG. 3. This terminates the electric power to electric motor 129.

In the event that wheels 61 and 62 sink into the material, collector 31 moves down below its selected operating position. Actuator arm 141 of motor control unit 137 will raise or move to its up on position. This causes the motor control unit 137 to supply power to the reversible electric motor 129 and to operate motor 129 in a second direction. Linear actuator 113 elongates, thereby moving the outer end of collector 31 up. The result is that the outer end of collector 31 will be elevated or raised until the collector 31 is in the selected operating position. The non-operation, elongation, and contraction of linear actuator 113 automatically continues during the movement of collector 31 around the silo wall. This action automatically maintains the outer end of the collector in its selected operating position.

When the sufficient material 26 has been removed from the sil the winch assembly is actuated to raise the silo unloader 27 to elevate the augers 42 and 43 above the top surface of material 26. The motor control unit 137 functions to actuate the electric motor 129 whereby the outer end of the unloader is held in an elevated position by the wheels 61 and 62. The augers and rotor of the impeller continue to rotate until the silo unloader is cleaned of material.

While there has been shown and described an embodiment of the invention and leveling and drive structure for a top unloading silo unloader, it is understood that other types of silo unloaders including silo unloaders having a single auger or an endless chain collector can be equipped with the leveling and drive structure of the invention. The other types of linear actuators can be used to change the relative positions of the drive wheels 61 and 62 and collector 31. Also, a single drive wheel can be used in lieu of double drive wheels to move collector 31 around the silo wall. The invention is defined in the following claims.

The embodiments of the invention in which an exclusive property or privilege is claimed are defined as follows:

1. A drive and leveling structure and control therefor for a top unloading silo unloader including a material collector having an outer end comprising: a base adapted to be mounted on the outer end of the collector, a first support movably connected to the base for generally upward and downward movement, a first drive wheel located adjacent the forward side of the collector, a first mount connecting the first wheel to the first support, a second support movably connected to the base for generally upward and downward movement, a second drive wheel located adjacent the trailing side of the collector, a second mount connecting the second wheel to the second support, a first arm secured to the first support, a second arm secured to the second support, linear extendible and contractable means connected to the first and second arms operable to pivot the supports and hold the supports in selected positions to maintain the outer end of the collector in a selected operating position, means for rotating the first and second wheels, a control unit mounted on the collector for controlling said linear extendible and contractable means, a reference arm adapted to be held in a fixed reference position, means connecting the reference arm to the control unit whereby relative movement between the reference arm and control unit operates the control unit which causes a change in the length of the linear extendible and contractable means thereby changing the elevation of the outer end of the collector means, said control unit includes movable means connected to the means connecting the reference arm to the control unit, said movable means being selectively locatable in a center off position, an up on position, and a down on position whereby when said outer end of the collector moves to a down position below the selected operating position, the movable means moves to the up on position operating the motor in the second direction to change the effective length of said linear extendible and contractable means thereby raising the outer end of the collector to the selected operating position, and when said outer end of the collector moves to a position above the selected operating position, the movable means moves to the down on position operating the motor in the first direction to change the effective length of said linear extendible and contractable means thereby allowing the collector to move to the selected operating position.

2. The structure of claim 1 wherein: the means connecting the reference arm to the movable means of the control unit includes an adjustable link whereby the selected operating position of the collector can be adjusted.

3. The structure of claim 2 wherein: said link includes a first member and a second member adjustably mounted on the first member whereby the length of the link can be adjusted.

4. The structure of claim 1 wherein: the base has a member having a first end and a second end, a first pair of downwardly directed ears secured to the first end, first pivot means pivotally connecting the first support to the first pair of ears, a second pair of downwardly directed ears secured to the second end, second pivot means pivotally connecting the second support to the second pair of ears, said first and second pivot means having axes extended transversely of the longitudinal extension of the base.

5. The structure of claim 1 wherein: the first and second mount each have means for angularly adjusting the position of the mount about an upright axis thereby adjusting the turning radius of the wheels.

6. The structure of claim 1 wherein: the linear extendible and contractable means includes a reversible electric motor operable in a first direction to contract said linear extendible and contractable means and operable in a second direction to extend said linear extendible and contractable means, said control unit connected to said electric motor to selectively control the operation of the electric motor.

7. The structure of claim 1 wherein: the movable means comprises a movable actuator arm selectively locatable in a center off position, an up on position, and a down on position, said means connecting the reference arm to the control unit includes a link connected to the reference arm and the actuator arm whereby when said collector moves to a down position below the selected position, the actuator arm moves to the up on position operating the motor in the second direction to extend said linear extendible and contractable means thereby raising the outer end of the collector to the selected operating position, and when said outer end of the collector moves to a position above the selected operating position, the actuator arm moves to the down on position operating the motor in the first direction to contract said linear extendible and contractable means thereby allowing the collector to move down to the selected operating position.

8. The structure of claim 1 wherein:, said silo unloader including non-rotatable means for directing materials to a discharge location, and rotatable means associated with the non-rotatable means for receiving materials from the collector and moving the materials through the non-rotatable means, said rotatable means including hinge means allowing the collector to pivot about a generally horizontal axis, said hinge means connecting a non-pivoting portion to a pivoting portion of the rotatable means, and means mounting the reference arm to the non-rotatable pivoting portion of the rotatable means to hold the arm in a fixed reference position.

9. The structure of claim 1 wherein: the means for rotating the first and second wheels includes power transmission means adapted to be mounted on the collector, and separate drive shafts connecting the power transmission means to the first and second drive wheels.

10. The structure of claim 9 wherein: the collector has a frame, said power transmission means being mountable on the frame remote and independent of the base and first and second supports connected to the base.

11. A leveling structure and control therefor for a top unloading silo unloader including a material collector having an outer end, non-rotatable first means for directing material to a discharge location, and second means associated with the non-rotatable means for receiving material from the collector and moving the material to the non-rotatable means, said second means including hinge means allowing the collector to pivot about a generally horizontal axis, said hinge means connecting a non-pivoting portion to a pivoting portion of the second means, comprising: a base adapted to be mounted on the outer end of the collector, a first support movably connected to the base for generally upward and downward movement, a first wheel located adjacent the forward side of the collector, a first mount connecting the first wheel to the first support, a second support movably connected to the base for generally upward and downward movement, a second wheel located adjacent the trailing side of the collector, a second mount connecting the second wheel to the second support, linear extendible and contractable means connected to the first and second supports operable to pivot the supports and hold the supports in selected positions to maintain the outer end of the collector in a selected operating position, a control unit mounted on the collector for controlling said linear extendible and contractable means, a reference arm, means mounting the reference arm to the non-pivoting portion of the second means to hold the arm in a fixed reference position, means connecting the reference arm to the control unit whereby relative movement between the reference arm and control unit operates the control unit which causes a change in the length of the linear extendible and contractable means thereby changing the elevation of the outer end of the collector.

12. The structure of claim 11 wherein: the means connecting the reference arm to the control unit includes an adjustable link whereby the selected operating position of the collector can be adjusted.

13. The structure of claim 12 wherein: said link includes a first member and a second member adjustably mounted on the first member whereby the length of the link can be adjusted.

14. The structure of claim 11 wherein: the base has a member having a first end and a second end, a first pair of downwardly directed ears secured to the first end, first pivot means pivotally connecting the first support to the first pair of ears, a second pair of downwardly directed ears secured to the second end, second pivot means pivotally connecting the second support to the second pair of ears, said first and second pivot means having axes extended transversely of the longitudinal extension of the base.

15. The structure of claim 11 wherein: the first and second mount each have means for angularly adjusting the position of the mount about an upright axis thereby adjusting the turning radius of the wheels.

16. The structure of claim 11 wherein: the linear extendible and contractable means includes a reversible electric motor operable in a first direction to contract said linear means and operable in a second direction to extend said linear means, said control unit connected to said electric motor to selectively control the operation of the electric motor.

17. A leveling structure and control therefor for a top unloading silo unloader including a material collector having an outer end, non-rotatable means for directing material to a discharge location, and rotatable means associated with the non-rotatable means for receiving material from the collector and moving the material to the non-rotatable means, said rotatable means including hinge means allowing the collector to pivot about a generally horizontal axis, said hinge means connecting a non-pivoting portion to a pivoting portion of the rotatable means, comprising: a base adapted to be mounted on the outer end of the collector, a first support movably connected to the base for generally upward and downward movement, a first wheel located adjacent the forward side of the collector, a first mount connecting the first wheel to the first support, a second support movably connected to the base for generally upward and downward movement, a second wheel located adjacent the trailing side of the collector, a second mount connecting the second wheel to the second support, linear extendible and contractable means connected to the first and second supports operable to pivot the supports and hold the supports in selected positions to maintain the outer end of the collector in a selected operating position, a control unit mounted on the collector for controlling said linear extendible and contractable means, a reference arm rotatable with the rotatable means, means mounting the reference arm to the non-pivoting portion of the rotatable means to hold the arm in a fixed reference position as it moves with the rotatable means, means connecting the reference arm to the control unit whereby relative movement between the reference arm and control unit operates the control unit which causes a change in the length of the linear extendible and contractable means thereby changing the elevation of the outer end of the collector, said control unit having a movable actuator arm selectively locatable in a center off position, an up on position, and a down on position, said means connecting the reference arm and the actuator arm whereby when said collector moves to a down position below the selected operating position, the actuator arm moves to the up on position operating the motor in the second direction to extend said linear extendible and contractable means thereby raising the collector to the selected operating position, and when said collector moves to a position above the selected operating position, the actuator arm moves to the down on position operating the motor in the first direction to contract said linear extendible and contractable means thereby allowing the collector to move down to the selected operating position.

18. A leveling structure and control therefor for a top unloading silo unloader including a material collector having an outer end, non-rotatable means for directing material to a discharge location, and rotatable means associated with the non-rotatable means for receiving material from the collector and moving the material to the non-rotatable means, said rotatable means including hinge means allowing the collector to pivot about a generally horizontal axis, said hinge means connecting a non-pivoting portion to a pivoting portion of the rotatable means, comprising: a base adapted to be mounted on the outer end of the collector, a first support movably connected to the base for generally upward and downward movement, a first wheel located adjacent the forward side of the collector, a first mount connecting the first wheel to the first support, a second support movably connected to the base for generally upward and downward movement, a second wheel located adjacent the trailing side of the collector, a second mount connecting the second wheel to the second support, linear extendible and contractable means connected to the first and second supports operable to pivot the supports and hold the supports in selected positions to maintain the outer end of the collector in a selected operating position, a control unit mounted on the collector for controlling said linear extendible and contractable means, a reference arm rotatable with the rotatable means, means mounting the reference arm to the non-pivoting portion of the rotatable means to hold the arm in a fixed reference position as it moves with the rotatable means, means connecting the reference arm to the control unit whereby relative movement between the reference arm and control unit operates the control unit which causes a change in the length of the linear extendible and contractable means thereby changing the elevation of the outer end of the collector, said control unit includes movable means connected to the reference arm, said movable means being selectively locatable in a center off position, an up on position, and a down on position whereby when said outer end of the collector moves to a down position below the selected operating position, the movable means moves to the up on position operating the motor in the second direction to extend said linear extendible and contractable means thereby raising the outer end of the collector to the selected operating position, and when said outer end of the collector moves to a position above the selected operating position, the movable means moves to the down on position operating the motor in the first direction to contract said linear extendible and contractable means thereby allowing the collector to move to the selected operating position.

19. The structure of claim 11 including: drive means for rotating the first and second wheels, said drive means including power transmission means adapted to be mounted on the collector, and separate drive shafts connecting the power transmission means to the first and second wheels.

20. The structure of claim 19 wherein: the collector has a frame, said power transmission means being mountable on the frame remote and independent of the base and first and second supports connected to the base.

21. An apparatus for removing material from a tower silo having a side wall with an open doorway comprising: first means having an elongated material collector including means for gathering material and moving the material to the central area of the silo, and impeller means for receiving material from the means for gathering material and moving the material in an upward direction; non-rotatable second means pendantly supported in the central area of the silo, said second means having means for receiving material from the impeller means and directing the material to the doorway; hinge means pivotally connecting the first means to the second means whereby the collector can move up and down, said hinge means having non-pivoting first means rotatably mounted on the second means and pivoting second means connected to the impeller means; leveling means mounted on the collector operable to selectively raise and lower the outer end of the collector and maintain the outer end of the collector in a selected operating position, said leveling means having wheels located adjacent opposite sides of the outer end of the collector and engageable with the top of the material in the silo, and actuator means for selectively raising and lowering the outer end of the collector relative to said wheels, said actuator means having a reversible motor operable in a first direction to raise the outer end of the collector and in a second direction to lower the outer end of the collector, motor control means mounted on the collector operable to control the operation of the motor; reference means mounted on the non-pivoting first means and rotatable therewith, said reference means being held in a fixed reference position during rotation thereof; and means connecting the reference means to the motor control means whereby relative up and down movement between the reference means and motor control means operates the motor control means which in turn controls the operation of the motor to selectively raise and lower the outer end of the collector to maintain the outer end of the collector in the selected operating position.

22. The apparatus of claim 21 wherein: the reference means is an elongated generally horizontal arm.

23. The apparatus of claim 21 including: biasing means holding the reference means on the non-pivoting first means.

24. The apparatus of claim 21 wherein: the means for gathering the material includes at least one auger operable to move material from the silo wall toward the center area of the silo.

25. The apparatus of claim 21 including: means to drive said wheels to move the collector around the wall of the silo.

26. The apparatus of claim 25 wherein: the means to drive said wheels includes a drive shaft connected to each wheel, and power transmitting means mounted on the collector and connected to each drive shaft for driving said drive shafts thereby rotating said wheels.

27. The structure of claim 21 wherein: the means connecting the reference means to the motor control means includes an adjustable link whereby the selected operating position of the outer end of the collector can be adjusted.

28. The structure of claim 27 wherein: said link includes a first member and a second member adjustably mounted on the first member whereby the length of the link can be adjusted.

29. The structure of claim 21 wherein: the leveling means includes first and second supports, a base member having a first end and a second end, a first pair of downwardly directed ears secured to the first end, first pivot means pivotally connecting the first support to the first pair of ears, a second pair of downwardly directed ears secured to the second end, second pivot means pivotally connecting the second support to the second pair of ears, said first and second pivot means having axes extended transversely of the longitudinal extension of the base member.

30. The structure of claim 21 wherein: the leveling means includes a mount for each wheel, each mount having means for angularly adjusting the position of the mount about an upright axis thereby adjusting the turning radius of the wheel.

31. The structure of claim 21 wherein: the leveling means includes a linear extendible and contractable means operated by said reversible motor to contract said linear extendible and contractable means and to extend said linear extendible and contractable means.

32. The structure of claim 31 wherein: the motor control means has a movable arm selectively locatable in a center off position, an up on position, and a down on position, said means connecting the reference means to the control means includes a link connected to the reference means and the actuator arm whereby when said outer end of the collector moves to a down position below the selected operating position, the actuator arm moves to the up on position operating the motor to extend said linear extendible and contractable means thereby raising the outer end of the collector to the selected operating position, and when said outer end of the collector moves to a position above the selected operating position, the actuator arm moves to the down on position operating the motor to contract said linear extendible and contractable means thereby allowing the outer end of the collector to move down to the selected operating position.

33. The structure of claim 21 wherein: the control means includes movable means connected to the reference arm, said movable means being selectively locatable in a center off position, an up on position, and a down on position whereby when said outer end of the collector moves to a down position below the selected operating position, the movable means moves to the up on position operating the motor in the second direction to extend said linear extendible and contractable means thereby raising the outer end of the collector to the selected operating position, and when said outer end of the collector moves to a position above the selected operating position, the movable means moves to the down on position operating the motor in the first direction to contract said linear extendible and contractable means thereby allowing the collector to move to the selected operating position.

34. A top unloading silo unloader for removing material stored in a tower silo having an upright wall and an open doorway comprising: first means movable around the silo wall for gathering material, second means moving the gathered material from the first means, said first means having an outer end locatable in a selected operating position, an up position, and a down position relative to the selected operating position, said second means includes a non-pivoting first portion and a pivoting second portion, means movably connecting the first portion with the second portion whereby the outer end of the first means can move between said up and down positions, third means for receiving material from the second means and directing the material to the open doorway, leveling means secured to the first means for maintaining the outer end of the first means in the selected operating position, a control unit mounted on the first means for controlling the leveling means, reference means mounted on the non-pivoting first portion of the second means, means connecting the reference means to the control unit whereby movement of the outer end of the first means to the down position actuates the control unit to operate the leveling means to raise the outer end of the first means, and movement of the outer end of the first means to the up position actuates the control unit to operate the leveling means to lower the outer end of the first means.

35. The structure of claim 34 wherein: the reference means is an elongated generally horizontal arm.

36. The structure of claim 34 including: a generally horizontal plate mounted to the non-pivoting first portion of the second means, and biasing means holding the reference means in engagement with the plate.

37. The structure of claim 34 wherein: the means for gathering the material includes at least one auger operable to move material from the silo wall toward the center area of the silo.

38. The structure of claim 34 wherein: said leveling means includes at least one wheel, and means to drive said wheel to move the first means around the wall of the silo.

39. The structure of claim 38 wherein: the means to drive said wheel includes a drive shaft connected to said wheel, and power transmitting means mounted on the first means and connected to the drive shaft for driving said drive shaft thereby rotating said wheel.

40. The structure of claim 34 wherein: the means connecting the reference means to the control unit includes an adjustable link whereby the selected operating position of the first means can be adjusted.

41. The structure of claim 40 wherein: said link includes a first member and a second member adjustably mounted on the first member whereby the length of the link can be adjusted.

42. The structure of claim 34 wherein: the leveling means includes first and second supports, a base member mounted on the outer end of the first means, said base member having a first end and a second end, a first pair of downwardly directed ears secured to the first end, first pivot means pivotally connecting the first support to the first pair of ears, a second pair of downwardly directed ears secured to the second end, second pivot means pivotally connecting the second support to the second pair of ears, said first and second pivot means having axes extended transversely of the longitudinal extension of the base member, and means for concurrently pivoting said first and second supports.

43. The structure of claim 34 wherein: the leveling means includes a wheel, a mount for said wheel, said mount having means for angularly adjusting the position of the mount about an upright axis thereby adjusting the turning radius of the wheel.

44. The structure of claim 34 wherein: the leveling means includes a linear extendible and contractable means operated by reversible motor to contract said linear extendible and contractable means and to extend said linear extendible and contractable means.

45. A top unloading silo unloader for removing material stored in a tower silo having an upright wall and an open doorway comprising: first means movable around the silo wall for gathering material, second means moving the gathered material from the first means, said first means having an outer end locatable in a selected operating position, and an up position and a down position relative to the selected operating position, said second means includes a non-rotatable member and a rotatable member, said rotatable member having a non-pivoting first portion and a pivoting second portion, hinge means pivotally connecting the first portion with the second portion whereby the outer end of the first means can move between said up and down positions, third means pendantly supportable in the silo for receiving material from the second means and directing the material to the open doorway, leveling means secured to the first means for maintaining the outer end of the first means in the selected operating position, a control unit mounted on the first means for controlling the leveling means, reference means mounted on the non-pivoting first portion of the rotatable member, means connecting the reference means to the control unit whereby movement of the outer end of the first means to the down position actuates the control unit to operate the leveling means to raise the outer end of the first means, and movement of the outer end of the first means to the up position actuates the control unit to operate the leveling means to lower the outer end of the first means, said leveling means includes a linear extendible and contractable means operated by a reversible motor to contract said linear extendible and contractable means and to extend said linear and contractable means, said control means has a movable actuator arm selectively locatable in a center off position, an up on position, and a down on position, said means connecting the reference means to the control means includes a link connected to the reference means and the actuator arm whereby when the outer end of said first means moves to a down position below the selected operating position, the actuator arm moves to the up on position operating the motor to extend said linear extendible and contractable means thereby raising the outer end of the first means to the selected operating position, and when the outer end of said first means moves to a position above the selected operating position, the actuator arm moves to the down on position operating the motor to contract said linear extendible and contracting means thereby allowing the first means to move down to the selected operating position.

46. A top unloading silo unloader for removing material stored in a tower silo having an upright wall and an open doorway comprising: first means movable around the silo wall for gathering material, second means moving the gathered material from the first means, said first means having an outer end locatable in a selected operating position, and an up position and a down position relative to the selected operating position, said second means includes a non-rotatable member and a rotatable member, said rotatable member having a non-pivoting first portion and a pivoting second portion, hinge means pivotally connecting the first portion with the second portion whereby the outer end of the first means can move between said up and down positions, third means pendantly supportable in the silo for receiving material from the second means and directing the material to the open doorway, leveling means secured to the first means for maintaining the outer end of the first means in the selected operating position, a control unit mounted on the first means for controlling the leveling means, reference means mounted on the non-pivoting first portion of the rotatable member, means connecting the reference means to the control unit whereby movement of the outer end of the first means to the down position actuates the control unit to operate the leveling means to raise the outer end of the first means, and movement of the outer end of the first means to the up position actuates the control unit to operate the leveling means to lower the outer end of the first means, said leveling means includes a linear extendible and contractable means operable to selectively raise and lower the outer end of the first means, and a reversible motor operable in a first direction to contract said linear extendible and contractable means and operable in a second direction to extend said linear extendible and contractable means, said central unit including movable means connected to the reference means, said movable means being selectively locatable in a center off position, an up on position, and a down on position whereby when said outer end of the first means moves to a down position below the selected operating position, the movable means moves to the up on position operating the motor in the second direction to extend said linear extendible and contractable means thereby raising the outer end of the first means to the selected operating position, and when said outer end of the first means moves to a position above the selected operating position, the movable means moves to the down on position operating the motor in the first direction to contract said linear extendible and contractable means thereby allowing the first means to move to the selected operating position.

47. The structure of claim 46 wherein: said leveling means includes a pair of wheels located adjacent opposite sides of the outer end of the first means, and power transmission means mounted on the first means remote from the wheels, and drive shafts connecting the power transmission means to the wheels whereby when power is applied to the power transmission means the wheels are rotated.

48. A top unloading silo unloader for removing material stored in a tower silo having an upright wall, comprising: first means movable around the silo wall for gathering material, second means moving the gathered material from the first means, said first means having an outer end to be positioned adjacent the silo wall and movable vertically between a selected operating position and an up position and a down position, second means pendantly supportable in the silo for receiving material from the first means and discharging the material from the silo, leveling means secured to the first means for maintaining the first means in the selected operating position, control means operably connected to said leveling means, reference means located in a reference location, and means connecting the reference means to the control means whereby movement of the first means to the down position actuates the control means to operate the leveling means to raise the first means, and movement of the frist means to the up position actuates the control means to operate the leveling means to lower the first means, said leveling means including a linear extendible and contractable means operated by a reversible motor to contract said linear extendible and contractable means and to extend said linear and contractable means, said control means having a movable actuator arm selectively locatable in a center off position, an up on position, and a down on position, said means connecting the reference means to the control means includes a link connected to the reference means and the actuator arm whereby when the outer end of said first means moves to a down position below the selected operating position, the actuator arm moves to the up on position operating the motor to extend said linear extendible and contractable means thereby raising the outer end of the first means to the selected operating position, and when the outer end of said first means moves to a position above the selected operating position, the actuator arm moves to the down on position operating the motor to contract said linear extendible and contracting means thereby allowing the first means to move down to the selected operating position.

49. A top unloading silo unloader for removing material stored in a tower silo having an upright wall, comprising: first means movable around the silo wall for gathering material, second means moving the gathered material from the first means, said first means having an outer end to be positioned adjacent the silo wall and movable vertically between a selected operating position and an up position and a down position, second means pendantly supportable in the silo for receiving material from the first means and discharging the material from the silo, leveling means secured to the first means for maintaining the first means in the selected operating position, control means operably connected to said leveling means, reference means located in a reference location, and means connecting the reference means to the control means whereby movement of the first means to the down position actuates the control means to operate the leveling means to raise the first means, and movement of the first means to the up position actuates the control means to operate the leveling means to lower the first means, said leveling means includes a linear extendible and contractable means operable to selectively raise and lower the outer end of the first means, and a reversible motor operable in a first direction to contract said linear extendible and contractable means and operable in a second direction to extend said linear extendible and contractable means, said central unit including movable means connected to the reference means, said movable means being selectively locatable in a center off position, an up on position, and a down on position whereby when said outer end of the first means moves to a down position below the selected operating position, the movable means moves to the up on position operating the motor in the second direction to extend said linear extendible and contractable means thereby raising the outer end of the first means to the selected operating position, and when said outer end of the first means moves to a position above the selected operating position, the movable means moves to the down on position operating the motor in the first direction to contract said linear extendible and contractable means thereby allowing the first means to move to the selected operating position.

50. The structure of claim 49 wherein: the reference means is an elongated generally horizontal arm.

51. The structure of claim 49 wherein: said leveling means includes at least one wheel, and means to drive said wheel to move the first means around the wall of the silo.

52. The structure of claim 51 wherein: the means to drive said wheel includes a drive shaft connected to said wheel, and power transmitting means mounted on the first means and connected to the drive shaft for driving said drive shaft thereby rotating said wheel.

53. The structure of claim 49 wherein: the means connecting the reference means to the control unit includes an adjustable link whereby the selected operating position of the first means can be adjusted.

54. The structure of claim 49 wherein: the leveling means includes first and second supports, a base member mounted on the outer end of the first means, said base member having a first end and a second end, a first pair of downwardly directed ears secured to the first end, first pivot means pivotally connecting the first support to the first pair of ears, a second pair of downwardly directed ears secured to the second end, second pivot means pivotally connecting the second support to the second pair of ears, said first and second pivot means having axes extended transversely of the longitudinal extension of the base member, and means for concurrently pivoting said first and second supports.

55. The structure of claim 49 wherein: the leveling means includes a linear extendible and contractable means operated by reversible motor to contract said linear extendible and contractable means and to extend said linear extendible and contractable means.

56. The structure of claim 49 wherein: said leveling means includes a pair of wheels located adjacent opposite sides of the outer end of the first means, and power transmission means mounted on the first means remote from the wheels, and drive shafts connecting the power transmission means to the wheels whereby when power is applied to the power transmission means the wheels are rotated.

57. A top unloading silo unloader for removing material stored in a tower silo having an upright wall comprising: a collector movable around the silo wall for gathering material, means moving the gathered material from the collector, said collector having an outer end located adjacent the silo wall, leveling means mounted on said outer end of the collector operable to maintain said outer end in a selected operating position, said leveling means including first and second drive wheel means engageable with the material located on opposite sides of the collector, power transmission means mounted on the collector, and drive shaft means connecting the power transmission means to the first and second wheel means whereby when power is applied to the power transmission means the first and second wheel means are rotated thereby moving the collector around the silo wall, said leveling means including a linear extendible and contractable means operated by a reversible motor to contract said linear extendible and contractable means and to extend said linear and contractable means, control means for controlling said motor, said control means having a movable actuator arm selectively locatable in a center off position, an up on position, and a down on position, reference means adapted to be held in a fixed reference position, means connecting the reference means to the control means including a link connected to the reference means and the actuator arm whereby when the outer end of said first means moves to a down position below the selected operating position, the actuator arm moves to the up on position operating the motor to change the effective length of said linear extendible and contractable means thereby raising the outer end of the first means to the selected operating position, and when the outer end of said first means moves to a position above the selected operating position, the actuator arm moves to the down on position operating the motor to change the effective length of said linear extendible and contracting means thereby allowing the first means to move down to the selected operating position.

58. The structure of claim 57 wherein: the collector has a frame, said power transmission means being mounted on the frame remote from the leveling means, said drive shaft means including a first shaft connected to the first wheel means and a second shaft connected to the second wheel means, and means drivably connecting said first and second shafts whereby the first and second wheels are concurrently rotated.

59. The structure of claim 57 including: control means operably connected to said leveling means, reference means located in a reference location, and means connecting the reference means to the control means whereby movement of the collector to a down position actuates the control means to operate the leveling means to raise the collector, and movement of the collector to an up position actuates the control means to operate the leveling means to lower the collector.

60. A top unloading silo unloader for removing material stored in a tower silo having an upright wall comprising: a collector movable around the silo wall for gathering material, means moving the gathered material from the collector, said collector having an outer end located adjacent the silo wall, leveling means mounted on said outer end of the collector operable to maintain said outer end in a selected operating position, said leveling means including first and second drive wheel means engageable with the material located on opposite sides of the collector, power transmission means mounted on the collector, and drive shaft means connecting the power transmission means to the first and second wheel means whereby when power is applied to the power transmission means the first and second wheel means are rotated thereby moving the collector around the silo wall, said leveling means includes a linear extendible and contractable means operable to selectively raise and lower the outer end of the first means, and a reversible motor operable in a first direction to contract said linear extendible and contractable means and operable in a second direction to extend said linear extendible and contractable means, reference means adapted to be held in a fixed reference position, control means for controlling said motor, said control means unit including movable means connected to the reference means, said movable means being selectively locatable in a center off position, an up on position, and a down on position whereby when said outer end of the first means moves to a down position below the selected operating position, the movable means moves to the up on position operating the motor in the second direction to extend said linear extendible and contractable means thereby raising the outer end of the first means to the selected operating position, and when said outer end of the first means moves to a position above the selected operating position, the movable means moves to the down on position operating the motor in the first direction to contract said linear extendible and contractable means thereby allowing the first means to move to the selected operating position.

* * * * *